(12) United States Patent
Maiwald et al.

(10) Patent No.: US 8,020,719 B2
(45) Date of Patent: Sep. 20, 2011

(54) CLOSURE

(75) Inventors: Dana Maiwald, Zurich (CH); David Tobler, Winterthur (CH); Andreas Widmer, Olten (CH); Fritz Dill, Langenthal (CH)

(73) Assignee: Sika Technology AG, Baar (CH)

( * ) Notice: Subject to any disclaimer, the term of this patent is extended or adjusted under 35 U.S.C. 154(b) by 391 days.

(21) Appl. No.: 12/222,416

(22) Filed: Aug. 8, 2008

(65) Prior Publication Data

US 2009/0101644 A1 Apr. 23, 2009

(30) Foreign Application Priority Data

Oct. 19, 2007 (EP) .................................... 07118851

(51) Int. Cl.
*B65D 51/18* (2006.01)
*B65D 43/18* (2006.01)
*B65D 41/00* (2006.01)
*B65D 43/00* (2006.01)
*B65D 51/00* (2006.01)

(52) U.S. Cl. ................. 220/254.1; 220/259.3; 220/325; 215/44; 215/235; 215/256; 215/277; 215/306; 524/261

(58) Field of Classification Search ............... 220/254.1, 220/259.3, 259.4, 325; 215/44, 235, 256, 215/277, 306; 524/261
See application file for complete search history.

(56) References Cited

U.S. PATENT DOCUMENTS

| 3,708,083 | A | 1/1973 | Gronemeyer et al. |
| 2005/0199655 | A1 | 9/2005 | Petit |
| 2006/0237388 | A1* | 10/2006 | Kick .............................. 215/235 |
| 2007/0205233 | A1 | 9/2007 | Petit et al. |

FOREIGN PATENT DOCUMENTS

| FR | 1 372 423 | 8/1964 |
| FR | 2 866 819 A1 | 9/2005 |
| FR | 2 886 306 A1 | 12/2006 |
| GB | 1 571 662 | 7/1980 |

* cited by examiner

*Primary Examiner* — Anthony Stashick
*Assistant Examiner* — Madison L Wright
(74) *Attorney, Agent, or Firm* — Oliff & Berridge, PLC

(57) ABSTRACT

The invention relates to a closure for a container for holding a fluid, more particularly an adhesion promoter composition, provided, having a base element which can be fastened in the region of a pour opening of the container and which has an opening through which the fluid can be withdrawn from the container, having a first closure element which in a closed position thereof effects fluid-tight sealing of the opening of the base element and which in an open position thereof releases the opening of the base element, and having a second closure element, which can be fastened to the base element in such a way as to be repeatedly releasable and which, in a container storage mode, secures the first closure element in its storage position and, for a container dispensing mode, releases the first closure element to bring it from its closed position into the open position.

32 Claims, 6 Drawing Sheets

FIG 3   III (IV)

CLOSURE

FIELD OF THE INVENTION

The invention pertains to a closure and also to a packaging form, and pack, having a closure of this kind.

BACKGROUND ART

Although also applicable to any desired closures, the present invention and also the set of problems on which it is based are discussed in more detail below with reference to a closure for a container filled with an adhesion promoter composition.

Adhesion promoters are substances which improve the adhesion, more particularly of adhesives and sealants, to surfaces on which bonding or sealing, respectively, is to take place. Compositions comprising adhesion promoters (adhesion promoter compositions) are typically produced by manufacturers in the chemical industry and supplied more particularly to customers from the automotive industry, for the purpose, for example, of the adhesive bonding of windscreens.

Accordingly there are essentially two requirements imposed on a closure of this kind:

The first requirement is to seal the container, filled with an adhesion promoter composition, during transport from the manufacturer to the customer and during its storage, in other words to prevent emergence of adhesion promoter composition from the container. During transport, and/or during storage, a pressure referred to as stacking pressure is exerted, as a result of the stacking of two or more such containers on top of one another, on containers located further down. Furthermore, with adhesion promoter compositions of this kind which contain a volatile solvent, a gas pressure is built up in the container over a relatively long time during transport, and/or during storage. Both the stacking pressure and the gas pressure are comparatively high, which means that the closure must have a high sealing effect in order to prevent emergence of the adhesion promoter composition.

The second requirement is to seal the container between applications of the adhesion promoter at the customer's premises. Application of the adhesion promoter to, say, a windscreen takes a few seconds. The container with the adhesion promoter is then put down until, a few minutes later, a further windscreen is ready for the application of the adhesion promoter composition. Between applications, the closure ought in particular to prevent emergence of the adhesion promoter composition if the container is accidentally knocked over, and to prevent emergence of the volatile solvent and the ingress of atmospheric moisture.

One prior art known to the applicant envisages a closure which has a cup and a screw cap. The cup is inserted into an opening to be closed, which is the opening of a pipe-like spout of a container, after which the screw cap is screwed onto an external thread of the spout and, in the course of this operation, presses the cup into the opening, as a result of which this opening is closed in a fluid-tight manner.

With the closure known to the applicant, the actuation of the closure prior to the application of the adhesion promoter composition, in other words the opening of the closure, and after the application of the adhesion promoter composition, in other words the closing of the closure, is very inconvenient since, on the one hand, the screwing and unscrewing of the rotating cap takes a comparatively long time and, on the other hand, the insertion and extraction of the cup represents a further comparatively time-consuming handling operation, requiring considerable coordination of both hands of the user.

EXPOSITION OF THE INVENTION

It is an object of the present invention to provide an improved closure for a container, featuring, more particularly, easier manual actuation of the closure between applications of the adhesion promoter composition. A further object of the present invention is to provide an improved packaging form, and pack, featuring such a closure.

In accordance with the invention at least one of these objects is achieved by a closure having the features of claim 1 and/or by a packaging form having the features of claim 27 and/or pack having the features of claim 28.

Provided accordingly is a closure for a container for holding a fluid, more particularly an adhesion promoter composition, having a base element, which can be fastened in the region of a pour opening of the container and which has an opening through which the fluid can be withdrawn from the container, having a first closure element which in a closed position thereof effects fluid-tight sealing of the opening of the base element and which in an open position thereof releases the opening of the base element, and having a second closure element, which can be fastened to the base element in such a way as to be repeatedly releasable and which, in a container storage mode, secures the first closure element in its closed position and, in a container dispensing mode, releases the first closure element to bring it from its closed position into the open position.

Further provided is a packaging form having a container which has a pour opening, and having the closure of the invention which is mounted in the region of the pour opening for the purpose of closing or opening thereof.

Provided, finally, is a pack consisting of a packaging form of the invention and a fluid, more particularly an adhesion promoter composition, as the contents.

The idea on which the present invention is based consists in providing a first closure element which is suitable for closing or opening a pour opening of the container automatically, i.e. without support from a further closure element. In this design, the first closure element is suitable for closing the pour opening of the container more particularly between applications of the adhesion promoter.

The second closure element may be provided, as and when required, for securing the first closure element when the container is to be stored or transported, more particularly stored or transported again and between applications of the adhesion promoter.

A resultant advantage is that there is no need for regular actuation of the second closure element between applications of the adhesion promoter. Time-consuming screwing and unscrewing of the screw cap, as in the prior art, therefore disappears, making it possible to achieve considerable time savings.

In the dependent claims there are advantageous embodiments, improvements and developments of the closure specified in claim 1 and/or of the packaging form specified in claim 27 and/or of the pack specified in claim 28.

By "fluid-tight" is meant, in the present text, impervious to gas and liquid.

By "moving" is meant, in the present text, rotational and/or translational movement.

By "second closure element which can be fastened repeatedly releasably" is meant that the second closure element can be fastened to the base element, and also released from it again, as often as desired.

By "secures the first closure element in its closed position" is meant that the second closure element prevents movement of the first closure element relative to the pour opening of the container in the container storage mode.

According to one preferred embodiment of the closure of the invention, the first closure element exhibits a first actuation time for moving it from the closed position into the open position and/or vice versa, and the second closure element exhibits a second actuation time for bringing it from its position assigned to the container storage mode into its position assigned to the container dispensing mode, and/or vice versa, provision being made for the first actuation time to be shorter than the second actuation time. By "actuation time" is meant, in the present text, the time a person, hence not a machine, needs for the moving of the respective closure elements. Advantageously, in accordance with this embodiment, there is a shorter first actuation time, more particularly between applications of the adhesion promoter composition, that occurs relatively frequently, while the longer, second actuation time occurs relatively seldom, before and after the applications of the adhesion promoter composition. The overall result is therefore time-saving operation of the closure.

In a further-preferred development of the closure of the invention, the first closure element in the closed position develops a first sealing effect and the second closure element in its position assigned to the container storage mode develops a second sealing effect, provision being made for the second sealing effect to be greater than the first sealing effect. The securing of the first closure element by means of the second closure element leads to the second sealing effect. By "sealing effect" is meant in the present case the maximum pressure within the container at which still just no fluid emerges from said container through the closure. This produces the advantage that, between the applications of the adhesion promoter composition, where the only things that need be prevented are the emergence of the adhesion promoter composition as a result, for example, of the container being tipped over, and the emergence of volatile solvent (with low gas pressure) and the ingress of atmospheric moisture, there is also provided correspondingly, only a low sealing effect, by means of the first closure element, and the required large second sealing effect is provided by means of the second closure element before and after the applications of the adhesion promoter composition, for storage and/or transport of the container.

In a further-preferred embodiment of the closure of the invention, the first actuation time is 1.5-10× shorter, preferably 5-8× shorter, than the second actuation time and/or the second sealing effect is 1.5-1,000×, preferably 500-800×, greater than the first sealing effect. This produces, advantageously, a first closure element having a very short actuation time and a small but sufficient sealing effect, and a second closure element having a somewhat longer actuation time but with a very high sealing effect.

In accordance with a further-preferred development of the closure of the invention, a snap connection is provided by means of which the first closure element and the base element can be connected to one another, and/or a screw connection is provided by means of which the second closure element and the base element can be connected to one another. A snap connection of this kind—by which is meant in the present case a connection which engages elastically at the rear—is suitable for providing the short first actuation time for the small but sufficient first sealing effect, and/or a screw connection is suitable for providing the high second sealing effect with the somewhat longer, second actuation time.

In the case of a further-preferred embodiment of the closure of the invention, a spout forms the pour opening, and the base element can be fastened to the spout and/or to a retaining ring mounted on the spout. By a "spout" is meant in the present case, more particularly, a pipe-like formation on the container that forms the pour opening in its end region. Retaining rings are common knowledge and are used with containers of this kind on which it is impossible or difficult to form a thread or other fastening means for the base element—in the case, for example, of a container made of thin aluminium. Retaining rings of this kind are pushed onto the spout, for example, which is then crimped in its end region in order to fix the retaining ring. Spouts are advantageous for targeted application, of the adhesion promoter composition for example. Of course, it is likewise possible to fasten the base element directly on the spout, in the case of containers made of plastic, for example, which can be easily designed with a suitable fastening means, in the form for example of a thread for the fastening of the base element.

In the case of a further-preferred embodiment of the closure of the invention, the base element has a fastening section for fastening the first closure element in the closed position. Although a fastening section of this kind can be provided in other ways, it is nevertheless very simple in construction terms to provide such a section on the base element. Preference is given here to form-fitting and/or frictional releasable fastening of the first closure element on the base element by means of the fastening section.

In accordance with a further-preferred development of the closure of the invention, the first closure element has a sealing lip, the sealing lip, in the closed position of the first closure element, bearing against the fastening section in a fluid-tight manner. In this way the closing of the opening of the base element is achieved in a very simple way. The sealing lip, as well as sealing the opening, may also serve for fastening on the fastening section, more particularly by means of form fitting and/or friction.

With further preference, the first fastening section has a sealing groove, and the sealing lip of the first closure element has a sealing bead, the sealing bead, in the closed position of the first closure element, elastically engaging releasably into the sealing groove. In this way both the sealing of the opening of the base element in a fluid-tight manner and also the fastening of the first closure element to the base element are achieved in a mechanically simple manner. Furthermore, the releasably elastic engagement of the sealing bead into the sealing groove may give the user an acoustic signal that the container has been closed by means of the first closure element.

In the case of a further-preferred embodiment of the closure of the invention, the base element has a clamping section which, in the container storage mode, for the purpose of securing the first closure element in its closed position, clamps an annular region of the first closure element between itself and the second closure element in a fluid-tight manner. In this way it is possible to prevent the first closure element moving relative to the container. This then leads to a situation in which, even in the case of pressure within the container that exceeds the sealing effect of the first closure element per se, that element continues to remain in its closed position closing the opening of the base element, since a relative movement, as described above, is prevented by means of the action of the second closure element on the first closure element.

The clamping section preferably has at least one sealing bead. In the container storage mode, this sealing bead is disposed between the first closure element and the annular region. Where the annular region and the second closure element then clamp the first closure element between them in the container storage mode, the second sealing effect is increased still further.

In accordance with one further-preferred development of the closure of the invention, the base element has a holding section within which the spout of the container can be held for the purpose of fastening the base element on the container, the holding section of the base element having preferably an internal thread for the screwing of the base element onto the container, more particularly onto the retaining ring, and/or has preferably an external thread for the screwing of the second closure element onto the base element. Accordingly the holding section is assigned a dual function: on the one hand it serves to fasten the base element to the container; on the other hand, the second closure element can be fastened to it.

In the case of a further-preferred development of the closure, the clamping section follows the holding section at an angle, more particularly at right angles, and/or the fastening section follows the clamping section at an angle, more particularly at right angles, for engagement into the spout. Where the base element is fastened to the spout of the container, the holding section engages around the spout externally, while the clamping section is disposed substantially parallel to the end face of the spout, and the fastening section extends into the spout.

In the case of a further-preferred development of the closure of the invention, the base element has a tray element having at least one hole, preferably having 6-12 holes, which is disposed on the container side in relation to the opening of the base element and which bows out away from said opening, the at least one hole allowing the fluid to be supplied to the opening. A tray element of this kind allows better metering and more precise application of the fluid, or of the adhesion promoter composition. In this way it is also possible for excess fluid to flow back into the container more easily again when the container is stood up.

In accordance with a further-preferred development of the closure of the invention, the tray element is connected in its marginal region to the fastening section. The fastening section thus forms, together with the tray element, a depression in which the sealing lip of the first closure element can be held.

In accordance with a further-preferred embodiment of the closure of the invention, the base element has an annular section with sealing means, more particularly sealing lamellae, for engagement into the spout in order to seal off a gap between the fastening section and the spout, the annular section being formed preferably with an internal offset with respect to the fastening section, and/or being preferably moulded-on on the tray element. Providing the annular section with an internal offset relative to the fastening section has the advantage that in this way there is sufficient space available for the provision of the sealing lamellae. Forming-on the annular section on the tray element is easy to achieve in manufacturing terms.

In the case of a further-preferred embodiment of the closure of the invention, the base element has at least one collar which follows the holding section and which is provided with at least one retaining cam for engagement into at least one recess of a guarantee band of the second closure element. By a "guarantee band" is meant, in the present text, a means which is fastened to the second closure element and must be separated from it in order to move the second closure element from its position assigned to the container storage mode into its position assigned to the container dispensing mode. After that has been done, however, the guarantee band can no longer be connected to the second closure element, and therefore indicates whether the second closure element has already been moved between these positions beforehand and, therefore, that it is possible that fluid has already been discharged from the container.

The guarantee band is preferably connected to the second closure element in such a way that it is secured against rotation. The recesses in the guarantee band that engage with the at least one retaining cam of the base element prevent rotation of the second closure element relative to the base element and hence prevent the second closure element being moved between its two positions, until the guarantee band is torn from the second closure element.

In the case of a further-preferred embodiment of the closure of the invention, the base element has a collar which follows the holding section and which is provided with at least one latching window for non-releasable engagement with at least one latching hook of the spout, more particularly with a latching hook of the retaining ring mounted on the spout. Accordingly the base element can be connected to the container easily and secured against rotation. Where the base element is screwed onto the spout and is thus connected to it, secured against rotation, any relative movement between the base element and the spout is impossible.

In the case of a further-preferred development of the closure of the invention, the first closure element is mounted on the base element in such a way that it can be swiveled between its closed position and its open position about a swivel axle. This produces the advantage that the first closure element does not constitute a separate part, which is easy to lose, but is instead connected to the base element, and yet the moving of the first closure element between its closed position and its open position continues to be enabled. Users are therefore more inclined to close the first closure element, since it is available easily to hand.

In accordance with a further-preferred embodiment of the closure of the invention, the swivel axle is formed on a collar of the base element that follows the holding section, and a lever, more particularly a z-shaped lever connects the swivel axle to the first closure element in an attachment region thereof. By a "z-shaped" lever is meant a lever having two sections substantially parallel to one another, and a section which extends between and substantially at right angles to the aforementioned sections and connects them at their ends, thus giving substantially a z shape of the sections relative to one another. Accordingly and advantageously, the first closure element, in the open position, in which it is disposed swiveled away from the opening of the base element, is at a large distance relative to the base element, and the first closure element is swiveled away over a comparatively large angle, with the result that the first closure element, in the case, for example, of application of the fluid, more particularly of the adhesion promoter composition, does not interfere and is not in the way.

In accordance with a further-preferred embodiment of the closure of the invention, the base element has a recess in which the lever is disposed retractably in the closed position of the first closure element. This embodiment makes it possible, advantageously, for the second closure element to be fastened to the base element without a collision with the first closure element.

In accordance with a further-preferred embodiment of the closure, the first closure element, more particularly opposite its attachment region on the lever, has an actuating tab for gripping from beneath for single-handed actuation of the first closure element to bring it from the closed position into the open position. This results in very easy operation of the closure with one hand, the other hand being available for other activities.

In the case of a further-preferred development of the closure of the invention, the base element and/or the lever and/or the first closure element are formed as one piece. This results in greatly simplified production of the closure. More particularly, in the case where the base element, the lever, and the swivel axle are formed in one piece from a plastic, the swivel axle may be formed, for example, by means of a tapered and hence flexible region which acts as a hinge between the lever and the base element and/or between the lever and the first closure element.

In accordance with a further-preferred development of the closure, in the storage mode the second closure element is braced with respect to the base element, more particularly by means of a screw connection, the second closure element securing the first closure element by pressing it against the base element in the closed position. Hence in a simple way the second sealing effect is obtained, and at the same time the screw connection represents a repeatedly releasable fastening of the second closure element on the base element.

In accordance with a further-preferred embodiment of the closure, the second closure element has an annular section, having an internal thread. Accordingly the second closure element can easily be screwed onto an external thread provided on the base element, for the purpose of achieving the above-described screw connection.

In accordance with a further-preferred embodiment of the closure, the second closure element has a guarantee band fastened to the annular section. This produces a spatially adjacent disposition of the guarantee band relative to the collar of the base element, as a result of which the above-described latching hooks are readily able to engage into the recess in the guarantee band, in order thus to fasten the second closure element secured against rotation relative to the base element. Where the second closure element is screwed onto the base element and secured against rotation by means of the guarantee band, it is possible to prevent the release of the second closure element without removal of the guarantee band beforehand.

The packaging form, which comprises a container that has a pour opening and a closure of the invention which is mounted in the region of the pour opening for the closing and opening thereof is suitable for the packaging of a fluid, more particularly of an adhesion promoter composition. Packaging forms of this kind are particularly appropriate for such substances, since they meet the requirements which arise in the transport, storage, and application of such substances.

The pack of the invention is composed of a packaging form as described and a fluid as the contents. A preferred fluid is, more particularly, an adhesion promoter composition.

The adhesion promoter composition comprises at least one adhesion-promoting substance, also referred to below as adhesion promoter. Preferably the adhesion promoter is selected from the group consisting of organosilicon compounds, organotitanium compounds, organozirconium compounds, polyisocyanates, isocyanate-containing polymers and mixtures thereof.

In the present document, substance names beginning with "poly", such as polyisocyanate, polyurethane, polyol, polyamine and polysulphide, for example, identify substances which in formal terms contain two or more of the functional groups which occur in their name, per molecule.

The term "polymer" embraces in the present document, on the one hand, a collective of chemically uniform macromolecules which nevertheless differ in respect of degree of polymerisation, molar mass and chain length this collective having been prepared by a polymerization reaction (addition polymerization, polyaddition, polycondensation). On the other hand the term also embraces derivatives of such a collective of macromolecules from polymerization reactions, in other words compounds which have been obtained by reactions, such as addition reactions or substitution reactions, for example, of functional groups on existing macromolecules and which may be chemically uniform or chemically non-uniform. The term further embraces what are known as pre-polymers—that is, reactive oligomeric preadducts whose functional groups are involved in the construction of macromolecules.

The term "polyurethane polymer" encompasses all polymers which are prepared by the process known as the diisocyanate polyaddition process. This also includes those polymers which are virtually or entirely free of urethane groups. Examples of polyurethane polymers are polyether-polyurethanes, polyester-polyurethanes, polyether-polyureas, polyureas, polyester-polyureas, polyisocyanurates and polycarbodiimides.

The organosilicon compound here contains at least one hydroxyl group, alkoxy group or acyloxy group attached to a silicon atom, and also at least one organic substituent attached to a silicon atom via a carbon-silicon bond. The organotitanium compound here has at least one substituent attached to the titanium atom via an oxygen-titanium bond. The organozirconium compound here has at least one substituent attached to the zirconium atom via an oxygen-zirconium bond.

Particularly suitable organosilicon compounds are organosilicon compounds of the formulae (I) or (II) or (III) or (IV).

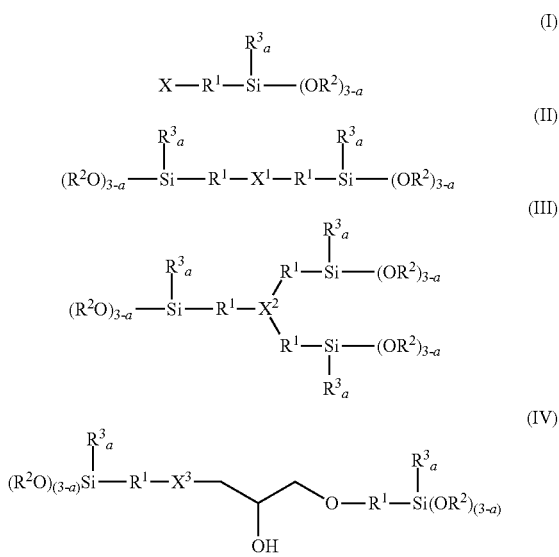

$R^1$ here is a linear or branched, optionally cyclic, alkylene group having 1 to 20 C atoms, optionally with aromatic fractions, and which optionally has one or more heteroatoms, more particularly nitrogen atoms.

$R^2$ here is H or is an alkyl group having 1 to 5 C atoms, more particularly methyl or ethyl, or an acyl group, more particularly acetyl, preferably methyl.

$R^3$ here is an alkyl group having 1 to 8 C atoms, more particularly methyl.

X here is H, or is a functional group which is selected from the group encompassing oxirane, OH, (meth)acryloyloxy, amine, SH, acylthio and vinyl, preferably amine. For the sake of completeness it is mentioned that by acylthio in this document is meant the substituent

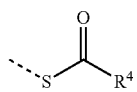

where $R^4$ is alkyl, more particularly having 1 to 20 carbon atoms, and the dashed line represents the bond to the constituent $R^1$.

$X^1$ here is a functional group which is selected from the group encompassing NH, S, $S_2$ and $S_4$.

$X^2$ here is a functional group which is selected from the group encompassing N and isocyanurate.

$X^3$ here is a functional group which is selected from the group consisting of S and $NR^5$, where $R^5$ is H, alkyl, cycloalkyl, aryl or the radical of the formula $—Si(R^3)_a(OR^2)_{(3-a)}$. Preferably these alkyl, cycloalkyl or aryl radicals $R^5$ have 1 to 10 C atoms.

a here is one of the values 0, 1 or 2, preferably 0.

The substituent $R^1$ is more particularly a methylene, propylene, methylpropylene, butylene or dimethylbutylene group. Using propylene group as substituent $R^1$ is particularly preferred.

Organosilicon compounds containing amino, mercapto or oxirane groups are also referred to as "aminosilanes", "mercaptosilanes" or "epoxysilanes".

Examples of suitable organosilicon compounds of the formula (I) are the organosilicon compounds selected from the group encompassing octyltrimethoxysilane, dodecyltrimethoxysilane, hexadecyltrimethoxysilane, methyloctyidimethoxysilane; 3-glycidyloxypropyltrimethoxysilane, 3-glycidyloxypropyltriethoxysilane; 3-methacryloyloxypropyltrialkoxysilanes, 3-methacryloyloxypropyl-triethoxysilane, 3-methacryloyloxypropyltrimethoxysilane; 3-aminopropyltrimethoxysilane, 3-aminopropyltriethoxysilane, 3-aminopropyl-dimethoxymethylsilane, 3-amino-2-methylpropyl-trimethoxysilane, N-(2-aminoethyl)-3-aminopropyltrimethoxysilane, N-(2-aminoethyl)-3-amino-propyltriethoxysilane, N-(2-aminoethyl)-3-aminopropyldimethoxymethylsilane, 4-aminobutyltrimethoxysilane, 4-aminobutyldimethoxymethylsilane, 4-amino-3-methylbutyltrimethoxysilane, 4-amino-3,3-dimethylbutyltrimethoxysilane, 4-amino-3,3-dimethylbutyldimethoxymethylsilane, [3-(2-aminoethylamino)-propyl]trimethoxysilane (i.e. 4,7,10-triazadecyltrimethoxysilane), 2-aminoethyl-trimethoxysilane, 2-aminoethyldimethoxymethylsilane, aminomethyltrimethoxy-silane, aminomethyldimethoxymethylsilane, aminomethylmethoxydimethylsilane, 7-amino-4-oxaheptyldimethoxymethylsilane, N-(methyl)-3-aminopropyltrimethoxysilane, N-(n-butyl)-3-aminopropyltrimethoxysilane; 3-mercaptopropyltriethoxysilane, 3-mercaptopropyltrimethoxysilane, 3-mercaptopropylmethyldimethoxysilane; 3-acylthiopropyltrimethoxysilane; vinyltrimethoxysilane and vinyltriethoxysilane.

Also preferred are the above-stated organosilicon compounds whose alkoxy groups have been replaced with acetoxy groups, such as octyltriacetoxysilane (octyl-Si(O(O=C)CH$_3$)$_3$), for example. Organosilicon compounds of this kind give off acetic acid on hydrolysis.

Among these stated organosilicon compounds, preference is given to those which have an organic substituent, attached to the silicon atom, that additionally has a functional group, in other words, which is not an alkyl group, and conforms to a formula (I) in which X is not H.

Examples of suitable organosilicon compounds of the formula (II) are the organosilicon compounds selected from the group encompassing bis[3-(trimethoxysilyl)propyl]amine, bis[3-(triethoxysilyl)propyl]amine, 4,4,15,15-tetraethoxy-3, 16-dioxa-8,9,10,11-tetrathia-4-15-disilaoctadecane (bis(triethoxysilylpropyl) polysulphide or bis(triethoxysilylpropyl) tetrasulphane), bis(triethoxysilylpropyl) disulphide.

Examples of suitable organosilicon compounds of the formula (III) are the organosilicon compounds selected from the group encompassing tris[3-(trimethoxysilyl)propyl]amine, tris[3-(triethoxysilyl)propyl]amine, 1,3,5-tris[3-(trimethoxysilyl)propyl]-1,3,5-triazine-2,4,6(1H,3H,5H)-trione-urea (i.e. tris(3-(trimethoxysilyl)propyl)isocyanurate) and 1,3,5-tris[3-(triethoxysilyl)propyl]-1,3,5-triazine-2,4,6(1H,3H, 5H)-trione-urea (i.e. tris(3-(triethoxysilyl)propyl) isocyanurate).

Suitable organosilicon compounds of the formula (IV) are more particularly the reaction products of 3-mercaptopropyltrimethoxysilane or 3-aminopropyl-trimethoxysilane or bis [3-(trimethoxysilyl)propyl]amine with 3-glycidyl-oxypropyltrimethoxysilane. Of preferred suitability are the reaction products of 3-aminopropyltrimethoxysilane and 3-glycidyloxypropyltrimethoxysilane. Organosilicon compounds of the formula (IV) also embrace intramolecular cyclic transesterification products.

Preferred organosilicon compounds are aminosilanes, more particularly aminosilanes with X=NH$_2$ or NH$_2$—CH$_2$—CH$_2$—NH, $X^1$=NH and $X^2$=N. Particularly preferred are 3-aminopropyltrimethoxysilane, N-(2-aminoethyl)-3-aminopropyltrimethoxysilane, bis[3-(trimethoxysilyl)propyl]amine, 3-aminopropyltriethoxysilane, N-(2-aminoethyl)-3-aminopropyltriethoxysilane and bis[3-(triethoxysilyl)propyl]amine and also their mixtures with one another.

Particularly suitable substituents attached to the titanium atom via an oxygen-titanium bond are those which are selected from the group encompassing alkoxy group, sulphonate group, carboxylate group, dialkyl phosphate group, dialkyl pyrophosphate group and acetylacetonate group.

Particularly suitable are compounds in which all substituents attached to the titanium are selected from the group encompassing alkoxy group, sulphonate group, carboxylate group, dialkyl phosphate group, dialkyl pyrophosphate group and acetylacetonate group, it being possible for all the substituents to be identical or different from one another.

Alkoxy groups which have proved to be particularly suitable are, more particularly, those known as neoalkoxy substituents, more particularly of the formula (V) below.

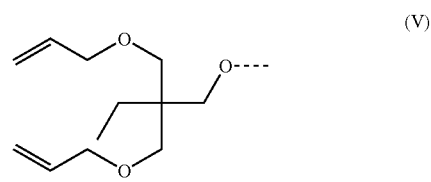

(V)

Sulphonic acids which have proved to be particularly suitable are, more particularly, aromatic sulphonic acids whose aromatics are substituted by an alkyl group. Preferred sulphonic acids are radicals of the formula (VI) below.

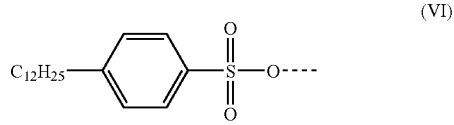

Carboxylate groups which have proved to be particularly suitable are, more particularly, carboxylates of fatty acids. A preferred carboxylate is decanoate.

In the formulae above, the dashed line represents the bond of the oxygen to the titanium.

Organotitanium compounds are available commercially, for example from the companies Kenrich Petrochemicals or DuPont. Examples of suitable organotitanium compounds are, for example, Ken-React® KR TTS, KR 7, KR 9S, KR 12, KR 26S, KR 33DS, KR 38S, KR 39DS, KR44, KR 134S, KR 138S, KR 158FS, KR212, KR 238S, KR 262ES, KR 138D, KR 158D, KR238T, KR 238M, KR238A, KR238J, KR262A, LICA 38J, KR 55, LICA 01, LICA 09, LICA 12, LICA 38, LICA 44, LICA 97, LICA 99, KR OPPR, KR OPP2 from Kenrich Petrochemicals or Tyzor® ET, TPT, NPT, BTM, AA, M-75, AA-95, AA-105, TE, ETAM, OGT from DuPont.

Preference is given to Ken-React® KR 7, KR 9S, KR 12, KR 26S, KR 38S, KR44, LICA 09, LICA 44, NZ 44, and also Tyzor® ET, TPT, NPT, BTM, AA, AA-75, AA-95, AA-105, TE, ETAM from DuPont.

Particularly preferred are organotitanium compounds which contain substituents, attached to the titanium atom via an oxygen-titanium bond, of the formulae (V) and/or (VI).

Suitable organozirconium compounds are more particularly those which carry at least one functional group which is selected from the group encompassing alkoxy group, sulphonate group, carboxylate group, phosphate or mixtures thereof, and which is attached directly to a zirconium atom via an oxygen-zirconium bond.

Alkoxy groups which have proved to be particularly suitable are, more particularly, isopropoxy substituents and those known as neoalkoxy substituents, more particularly of the formula (V) below

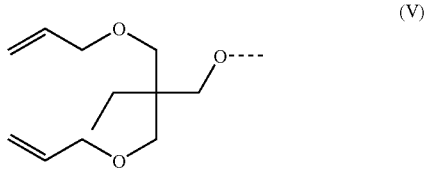

Sulphonic acids which have proved to be particularly suitable are, more particularly, aromatic sulphonic acids whose aromatics are substituted by an alkyl group. Preferred sulphonic acids are radicals of the formula (VI) below.

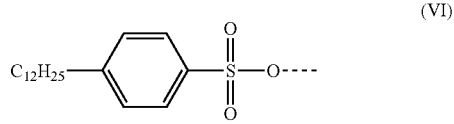

Carboxylate groups which have proved to be particularly suitable are, more particularly, carboxylates of fatty acids. Preferred carboxylates are stearates and isostearates.

In the formulae above, the dashed line represents the bond of the oxygen to the zirconium.

Organozirconium compounds are available commercially, for example from the company Kenrich Petrochemicals. Suitable organozirconium compounds are, for example, Ken-React® NZ 38J, NZ TPPJ, KZ OPPR, KZ TPP, NZ 01, NZ 09, NZ 12, NZ38, NZ 44, NZ 97.

It is clear to a person skilled in the art that these organosilicon compounds, organotitanium compounds and organozirconium compounds hydrolyse under the influence of water and form OH groups attached to the Si, Ti or Zr atom. Hydrolysed, or partly hydrolysed, organosilicon compounds, organotitanium compounds and organozirconium compounds of this kind may then in turn undergo condensation and form condensation products which contain Si—O—Si, Ti—O—Ti, Zr—O—Zr bonds. Where silanes and/or titanates and/or zirconates as adhesion promoters are mixed, mixed condensation products containing Si—O—Ti, Si—O—Zr or Ti—O—Zr bonds are also possible. A small fraction of condensation products of these kinds is possible, particularly when they are soluble, emulsifiable or dispersible.

The adhesion promoter composition preferably comprises at least one organosilicon compound. In certain cases a combination of organosilicon compounds and organotitanium compounds is particularly preferred.

Suitable polyisocyanates are, more particularly, diisocyanates or triisocyanates. Preference is given to commercially available polyisocyanates, such as, for example, 1,6-hexamethylene diisocyanate (HDI), 2-methylpentamethylene 1,5-diisocyanate, 2,2,4- and 2,4,4-trimethyl-1,6-hexamethylene diisocyanate (TMDI), 1,12-dodecamethylene diisocyanate, lysine diisocyanate and lysine ester diisocyanate, cyclohexane 1,3- and 1,4-diisocyanate and any desired mixtures of these isomers, 1-isocyanato-3,3,5-trimethyl-5-isocyanatomethtylcyclohexane (i.e. isophorone diisocyanate or IPDI), perhydro-2,4'- and -4,4'-diphenylmethane diisocyanate (HMDI), 1,4-diisocyanato-2,2,6-trimethylcyclohexane (TMCDI), 1,3- and 1,4-bis(isocyanatomethyl)cyclohexane, m- and p-xylylene diisocyanate (m- and p-XDI), m- and p-tetramethyl-1,3- and -1,4-xylylene diisocyanate (m- and p-TMXDI), bis(1-isocyanato-1-methylethyl)naphthalene, 2,4- and 2,6-toluoylene diisocyanate and any desired mixtures of these isomers (TDI), 4,4'-, 2,4'- and 2,2'-diphenylmethane diisocyanate and any desired mixtures of these isomers (MDI), 1,3- and 1,4-phenylene diisocyanate, 2,3,5,6-tetramethyl-1,4-diisocyanatobenzene, naphthalene 1,5-diisocyanate (NDI), 3,3'-dimethyl-4,4'-diisocyanatobiphenyl (TODI), and also any desired mixtures of the aforementioned isocyanates and their biurets or their isocyanurates. Particular preference is given to MDI, TDI, HDI and IPDI and to their biurets or isocyanurates.

Polymers containing isocyanate groups can be obtained more particularly from the above-stated polyisocyanates and polyols and/or polyamines in a known way.

The fraction of the adhesion promoter is preferably 1-80% by weight, more particularly 5-70% by weight, more preferably 10-40% by weight, as a proportion of the adhesion promoter composition as a whole. If the adhesion promoter is an organosilicon compound or an organotitanium compound, the fraction of the adhesion promoter preferably as a proportion of the adhesion promoter composition overall is preferably 1-15% by weight.

In one preferred embodiment the adhesion promoter composition further comprises at least one solvent. Solvents used are, more particularly, alcohols, ethers, ketones, esters or hydrocarbons, preferably isopropanol, ethanol, methyl ethyl ketone, acetone, hexane, heptane, xylene, toluene or acetates, more particularly ethyl acetate or butyl acetate. Additionally it is possible to use water or mixtures of water with the stated alcohols, ethers, ketones, esters or hydrocarbons as solvents. Preferred solvents are those which have a boiling point of $\leq 100°$ C. at 1013 mbar.

The adhesion promoter composition may include further constituents; more particularly these are fillers, especially carbon black, film formers, surfactants, acids, catalysts, biocides, anti-settling agents, driers, stabilizers, pigments, dyes, corrosion inhibitors, odorants, thixotropic agents, fillers, defoamers and the like.

The adhesion promoter composition preferably consists of adhesion promoter and solvent.

BRIEF DESCRIPTION OF THE FIGURES

The invention is elucidated in more detail below with reference to the exemplary embodiment shown schematically in the figures.

In the figures, identical reference symbols denote identical or functionally identical components.

EMBODIMENT OF THE INVENTION

Figure 1:
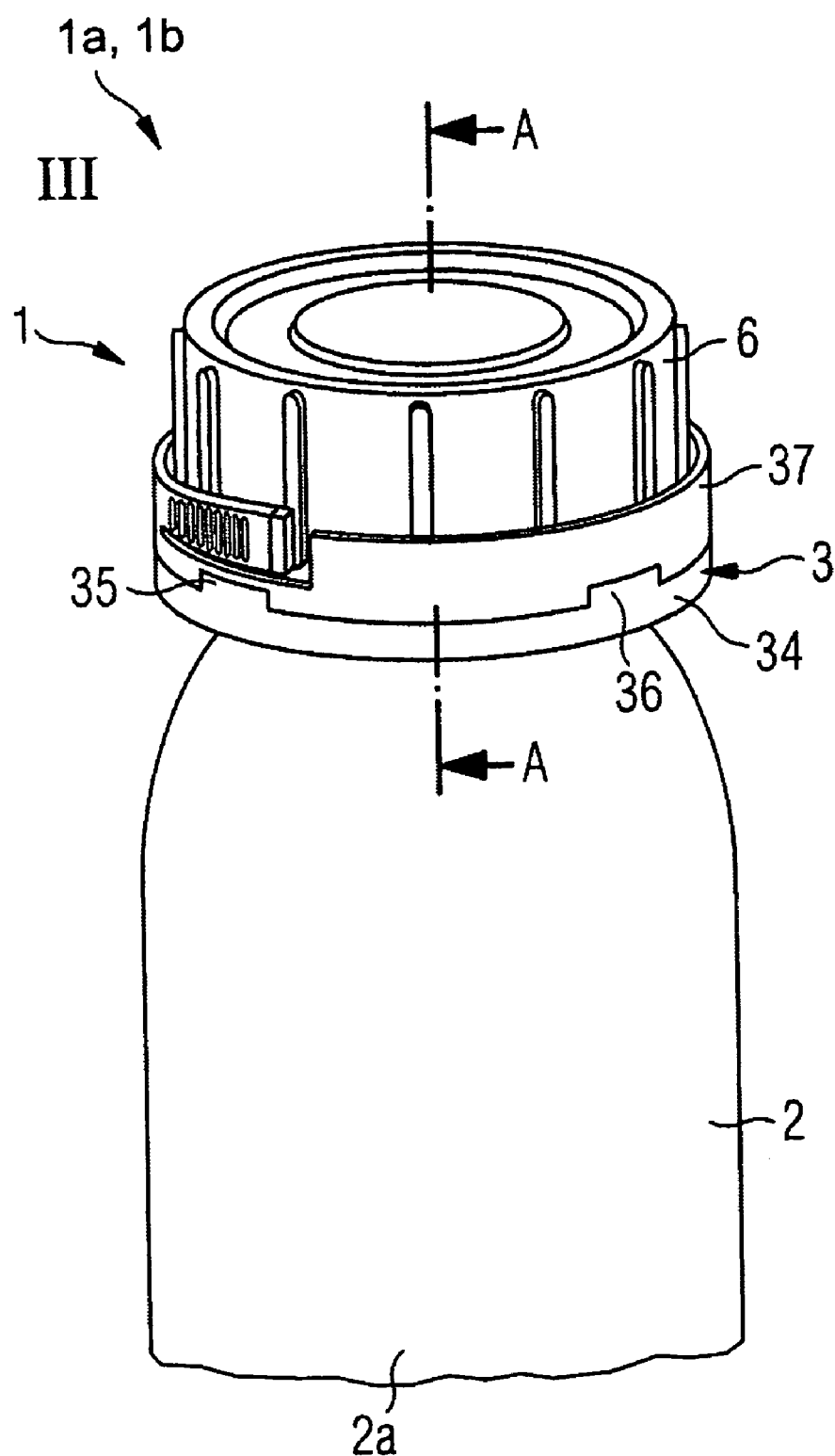
FIG. 1 shows a perspective view of a packaging form, and pack, with a container according to one exemplary embodiment of the present invention, the container being in a storage mode.

FIG. 1 shows a packaging form 1a, and a pack 1b, having a bottle-like container 2 which in its interior has an adhesion promoter composition 2a, and a closure 1, which is mounted on the container 2. The pack 1b is composed of the packaging form 1a and the adhesion promoter composition 2a as its contents.

Figure 3:
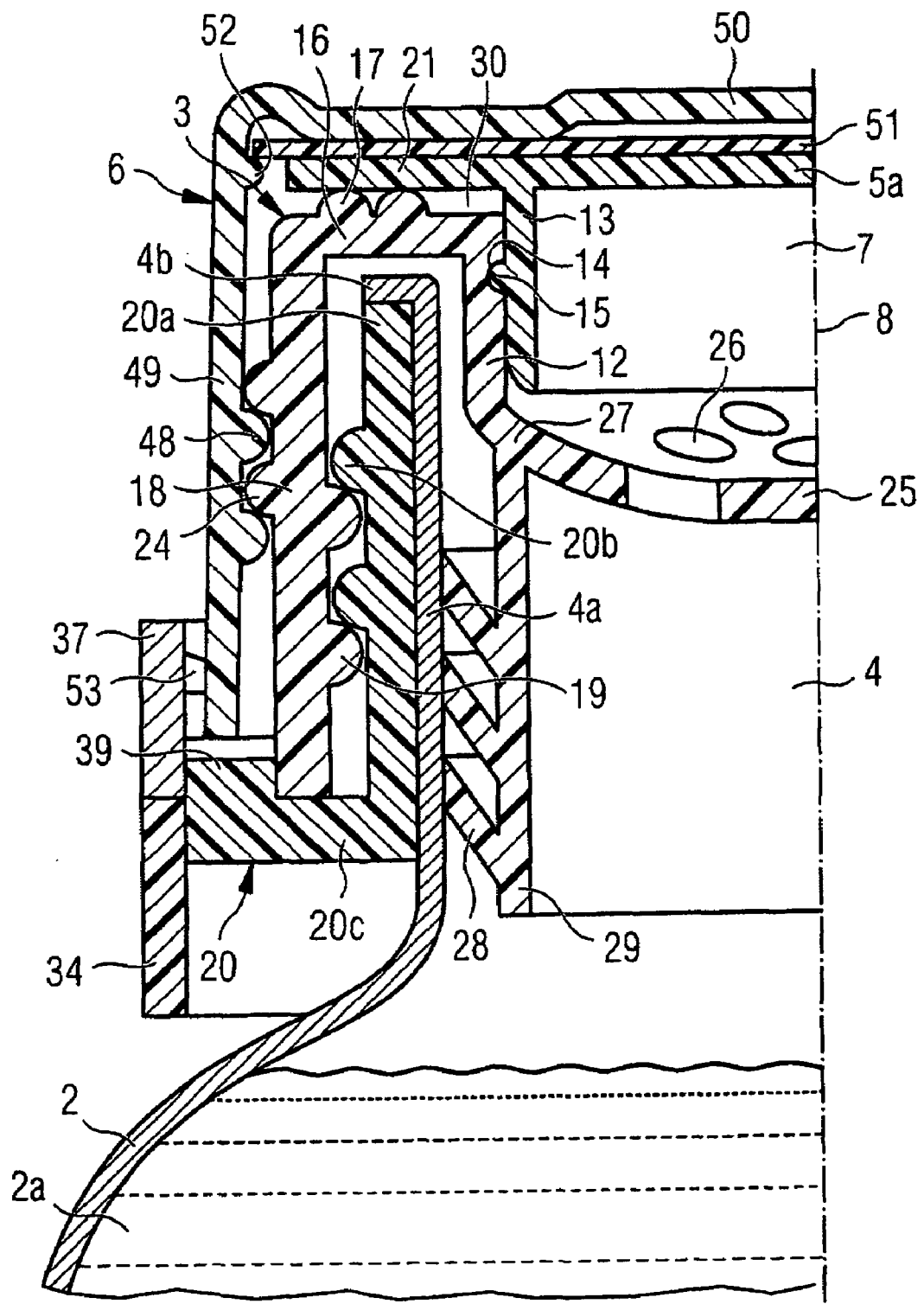
FIG. 3 shows a half-section A-A from FIG. 1.

As is apparent from FIG. 3, a pipe-like spout 4a is formed-on on the container 2 and forms a pour opening 4 of the container 2. Pushed onto the spout 4a is a retaining ring 20, which is fixed to the spout 4a by the crimping of the end 4b around the spout 4a.

Figure 4:
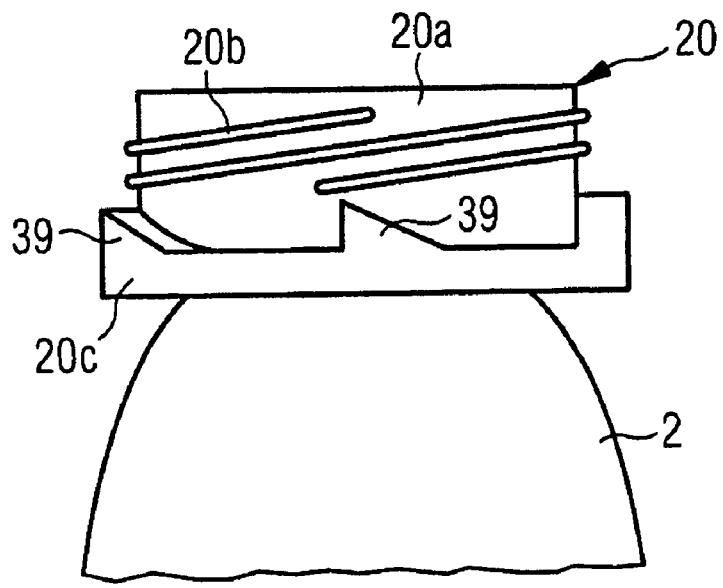
FIG. 4 shows a side view of a container with a retaining ring according to the exemplary embodiment.

The retaining ring 20 has an approximately L-shaped cross-section with a long leg 20a, which extends approximately parallel to the longitudinal axis 8 of the spout 4a, and a short leg 20c, which extends approximately radially to the longitudinal axis 8 of the spout 4a. The long leg 20a bears on the inside against the spout 4a and on the outside has an external thread 20b. Formed on the end of the short leg 20c facing away from the long leg 20a, as apparent more particularly from FIG. 4, are a plurality of ramp-like latching hooks 39.

Screwed onto the retaining ring 20 is a base element 3. For this purpose the base element 3 has a holding section 18 with an internal thread 19 and an external thread 24. As shown in FIG. 3, the internal thread 19 of the holding section is located in engagement with the external thread 20b of the retaining ring 20.

Figure 5:
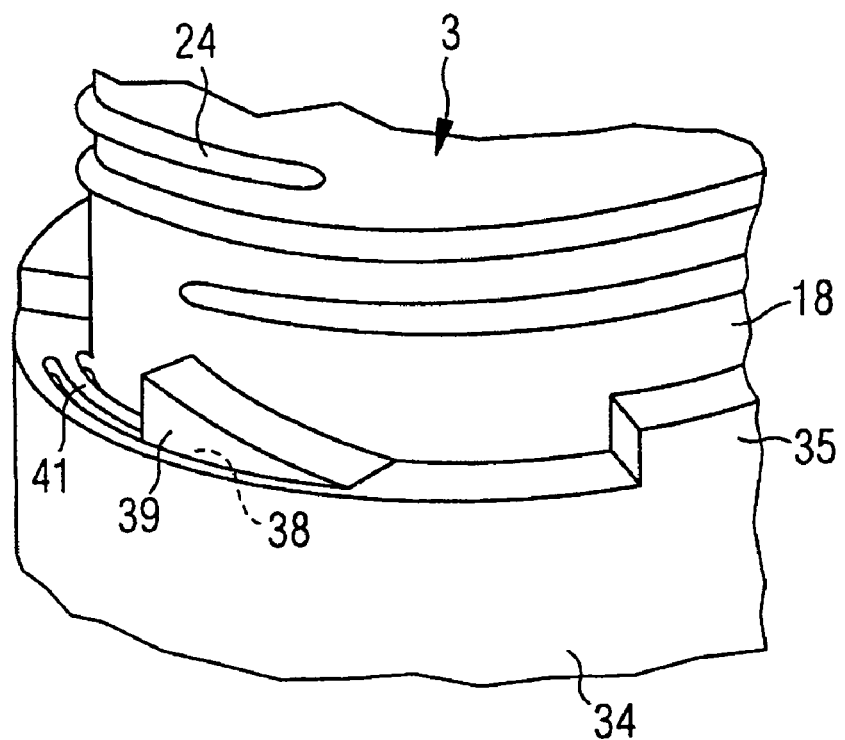
FIG. 5 shows in perspective view a base element screwed onto the retaining ring from FIG. 4, according to the exemplary embodiment.

As apparent more particularly from FIG. 5, formed-on on one end of the holding section 18 is a collar 34 having latching windows 38 and latching fingers 41 adjacent to them. Where the base element 3 is screwed onto the retaining ring 20, its internal thread 19 and external thread 20 come into engagement with one another, and the latching fingers 41 engage the latching hooks 39 elastically from the rear towards the end of the screwing motion, the latching hooks 39 then extending through the latching windows 38. For this purpose the latching fingers 41 are formed preferably of an elastic plastic which, however, is sufficiently rigid to ensure a reliable, non-releasable connection between the base element 3 and the retaining ring 20.

As depicted further in FIG. 3, the holding section 18 of the base element 3 is followed at right angles by a clamping section 16, which has a cross-section which extends substantially radially with respect to the longitudinal axis 8. On its side facing away from the spout 4a, the clamping section 16 has, in particular, two sealing beads 17.

The clamping section 16 is followed substantially at right angles by a fastening section 12. The fastening section 12 has a circumferential sealing groove 14, which in the mode depicted in FIG. 3 is in engagement with a sealing bead 15 formed on a sealing lip 13 of a first closure element 5.

The fastening section 12 is followed by a tray element 25 which has a plurality of holes (identified by way of example with the reference symbol 26). In its marginal region 27, the tray element 25 is connected to the fastening section 12 and it bows in the direction of the container interior.

Formed-on with an inwards radial offset with respect to the longitudinal axis 8, on the tray element 25, is an annular section 29 with sealing lamellae (identified by way of example with the reference symbol 28). The sealing lamellae 28 seal off a gap 30 between the base element 3 and the spout 4a in a fluid-tight manner.

The fastening section 12, the tray element 25 and also the annular section 29 extend into the spout 4a.

Figure 2:
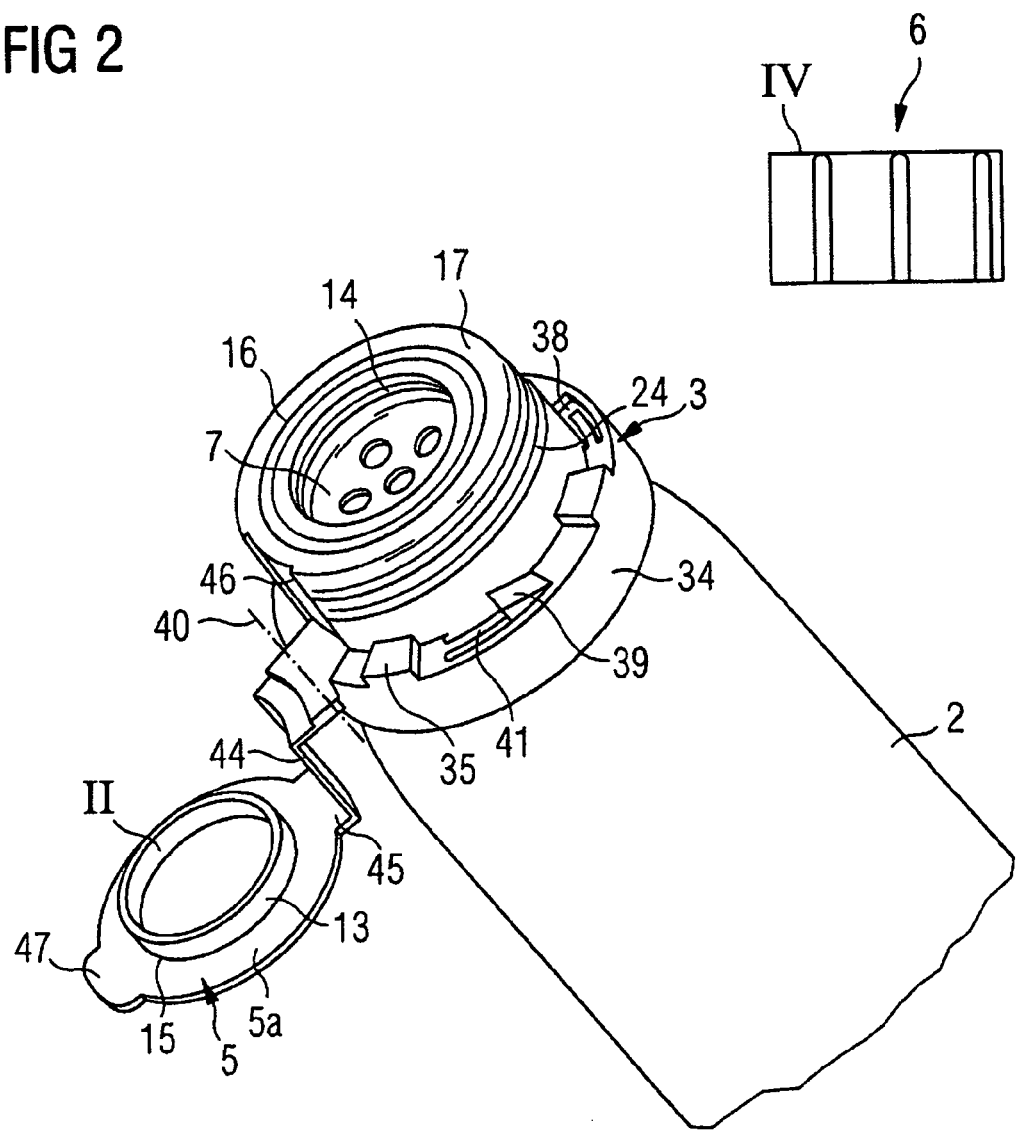
FIG. 2 shows the view from FIG. 1, a first closure element being in an open position.
Figure 6:
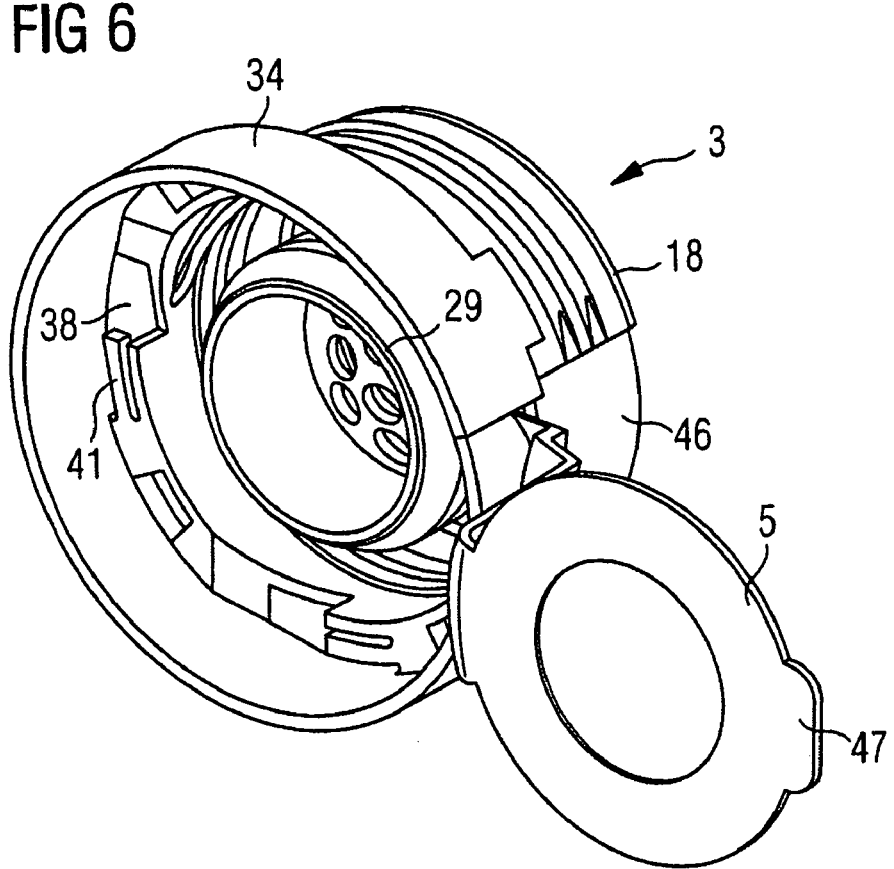
FIG. 6 shows a perspective view from beneath the base element according to the exemplary embodiment.
Figure 7:
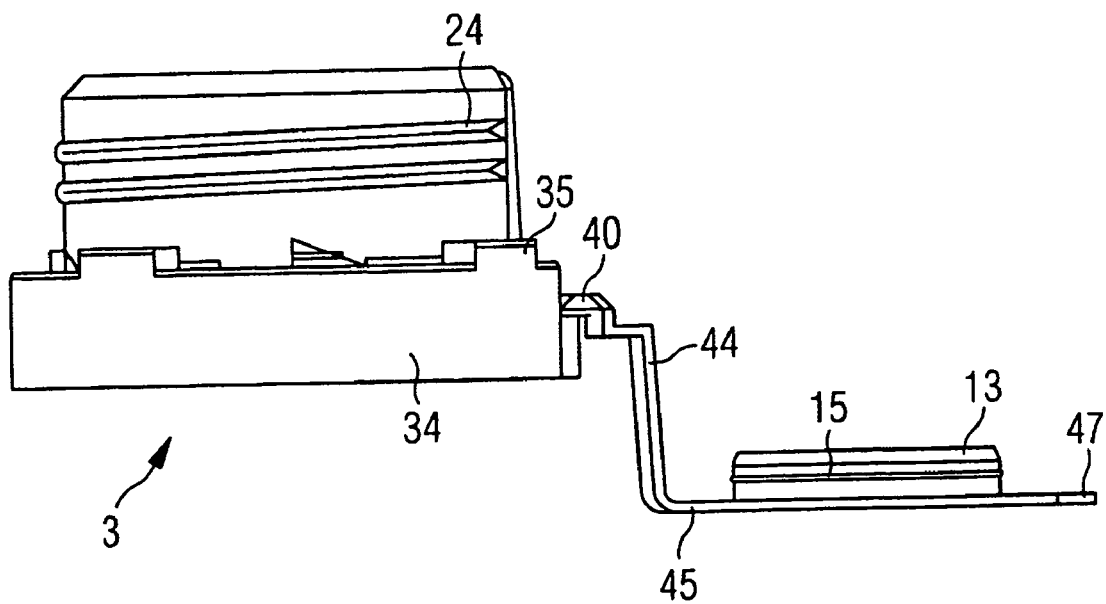
FIG. 7 shows a side view of the base element from FIG. 6.
Figure 8:
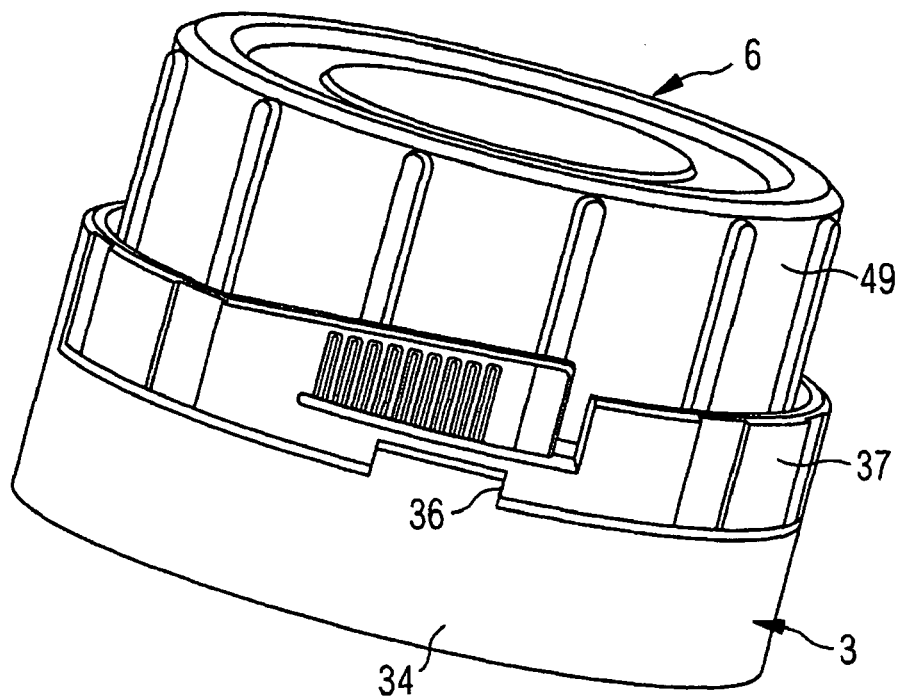
FIG. 8 shows in a perspective view, from above at an oblique angle, the first and second closure elements according to the exemplary embodiment.
Figure 9:
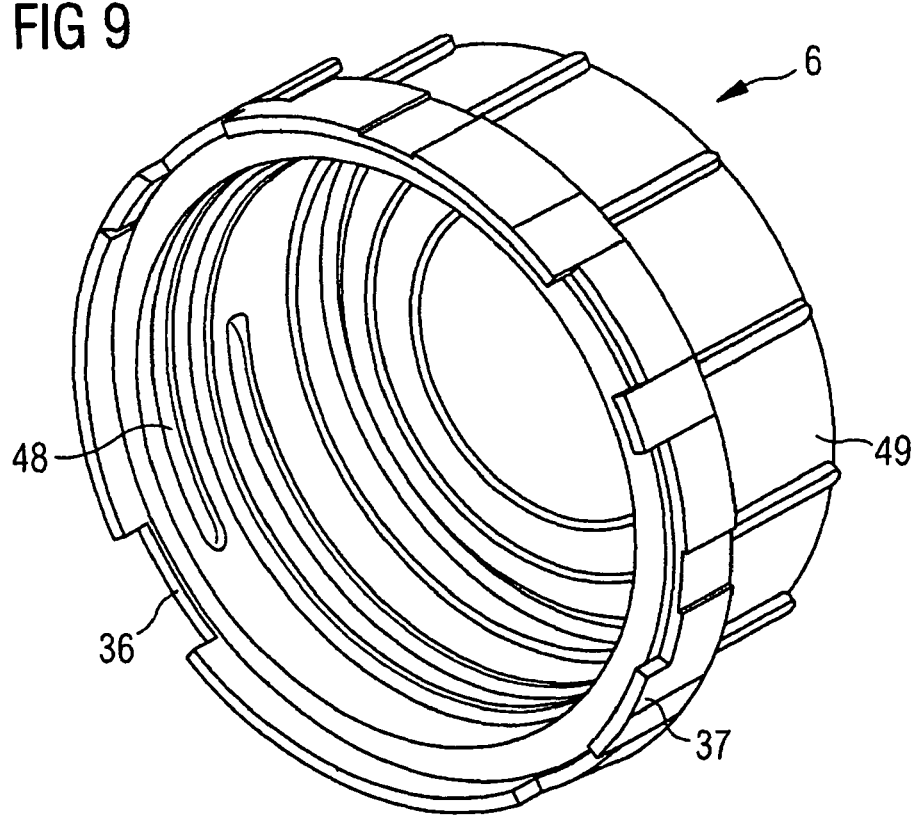
FIG. 9 shows in a perspective view only the second closure element and not the first closure element from FIG. 8, from below, at an oblique angle.

As apparent more particularly from FIG. 2, a z-shaped lever 44 is mounted on the base element 3 in such a way that it can be swiveled about a swivel axle 40, preferably on the collar 34 (see also FIG. 7). At its other end the lever 44 is connected to the first closure element 5. The first closure element 5 has a disc-shaped element 5a on which the sealing lip 13 is formed on. This sealing lip 13 extends substantially perpendicular to the plane of the disc-shaped element 5a. Located opposite the attachment region 45, the disc-shaped element 5a has an actuating tab 47 for the single-handed actuation of the first closure element 5. In the container storage mode III depicted in FIG. 3, the lever 44 is disposed retractedly in a recess 46—see FIG. 6—in the collar 34 and in the holding section 18. In this mode it is possible for a cap-like second closure element 6—see FIGS. 8 and 9—with an annular section 49 having an internal thread 48 to be screwed onto the holding section 18, which has the external thread 24.

Beneath a lid region 50, which is followed by the annular section 49, the second closure element 6 has a sealing film 51 which is held form-fittingly on the lid region 50 by means of a lug 52.

Fastened to the annular section 49 (see FIG. 8) by means of tear-off elements 53 (see FIG. 3) is a guarantee band 37. The guarantee band 37 has recesses 36 which, in the storage mode III depicted in FIG. 3, are in engagement with retaining cams 35 which are formed-on on the collar 34 of the base element 3. Accordingly the second closure element 6 cannot be parted from the base element 3 without removal of the guarantee band 37. In the text below, the different positions of the individual elements, more particularly those of the first and second sealing elements 5 and 6, will be elucidated.

In the mode depicted in FIGS. 1 and 3, the packaging form 1a, or the pack 1b, is transported to the customer, a motor vehicle manufacturer, for example, and is stored at those premises until there is demand for the adhesion promoter composition 2a.

In the container 2 storage mode III depicted in FIG. 3, the sealing bead 15 of the first closure element 5, together with the sealing groove 14 of the fastening section 12 of the base element 3, develops a first sealing effect and thus prevents emergence of the adhesion promoter composition 2a from the spout 4a. The first closure element 5 is in the closed position I.

In the position shown in FIG. 3, the second closure element 6 is braced with the base element 3 by means of the threads 24 and 48. The lid region 50, by means of the sealing insert 51, presses against the first closure element 5 and hence prevents the sealing means 14 and 15 moving relative to one another, so producing a second sealing effect. This second sealing effect is preferably reinforced by the fact that the lid region 50, by means of the sealing insert 51, presses an annular region 21 of the closure element 5 against the sealing beads 17 on the clamping section 16. This produces a further barrier which the adhesion promoter composition 2a would have to overcome for the closure 1 to leak.

Unscrewing of the second closure element 6 from the base element 3 is prevented in the as-supplied state by means of the guarantee band 37.

When application of the adhesion promoter composition 2a is desired, the guarantee band 37 is removed, allowing a rotational movement of the second closure element 6 relative to the base element 3. When the second closure element 6 is then unscrewed, the result is the container 2 dispensing mode IV (for which the second closure element 6 must be imagined to be absent from FIG. 3). The interior of the container 2 is now sealed with the first sealing effect by means of the first sealing element 5. The first closure element 5 continues to be located in the closed position I.

Shortly before the adhesion promoter composition is applied it is then possible, more particularly one-handedly, to move the first closure element 5 from its closed position I into the open position II by means of swiveling of the first closure element 5 about the swivel axle 40. For this purpose the actuation tab 47 is moved around the swivel axle 40 with the thumb of one hand.

Subsequently, for example, the container 2 is tipped and the adhesion promoter composition 2a flows into the pour opening 4, through the holes 26 in the tray element 25 and out of the base element 3, and can be applied directly to a region that is to be treated.

The snap closure formed by the sealing means 14 and 15 can be released very quickly from the base element 3 as compared with the unscrewing of the second closure element 6.

If, then, no further adhesion promoter composition 2a is required in the short term, the first closure element 5 is swiveled again about the swivel axle 40 and pressed against the base element 3, with the consequence that the sealing means 14 and 15 come into engagement again, and the sealing bead 15 snaps into the sealing groove 14. This can be very quickly accomplished manually.

The moving of the first closure element 5 between the closed position I and the open position II can then be repeated as often as desired until it is the case that adhesion promoter composition 2a is not needed for a relatively long time, and the packaging form 1a or pack 1b is stored again, for example. Thereafter, in a simple way, the second closure element 6 can be screwed onto the base element 3 with the first closure element 5 in the closed position I, in which case the interior of the container 2 is again sealed with the second sealing effect.

When adhesion promoter composition 2a is needed again, the second closure element 6 can again be simply unscrewed from the base element 3, and the steps above can be repeated as often as desired.

The invention is not confined to the specific construction of a packaging form 1a, or pack 1b, or closure 1, as depicted in the above figures, but instead can be modified in a diversity of ways.

LIST OF REFERENCE SYMBOLS

1 Closure
1a Packaging form
1b Pack
2 Container
2a Fluid, adhesion promoter composition
3 Base element
4 Pour opening
4a Spout
5 First closure element
5a Disc-shaped element
6 Second closure element
7 Opening
8 Longitudinal axis
12 Fastening section
13 Sealing lip
14 Sealing groove
15 Sealing bead
16 Clamping section
17 Sealing bead
18 Holding section
19 Internal thread
20 Retaining ring
20a Long leg
20b External thread
20c Short leg
21 Annular region
24 External thread
25 Tray element
26 Hole
27 Marginal region
28 Sealing lamellae
29 Annular section
30 Gap
34 Collar
35 Retaining cam
36 Recess
37 Guarantee band
38 Latching window
39 Latching hook
40 Swivel axle
41 Latching finger
44 Lever
45 Attachment region
46 Recess
47 Actuating tab
48 Internal thread
49 Annular section 50 Lid region
51 Sealing insert
52 Lug
53 Tear-off element
I Closed position
II Open position
III Storage mode
IV Dispensing mode

The invention claimed is:

1. Closure for a container for holding a fluid, the closure comprising:
    a base element which can be fastened in a region of a pour opening of the container and which has an opening through which the fluid can be withdrawn from the container,
    a first closure element which in a closed position thereof effects fluid-tight sealing of the opening of the base element and which in an open position thereof releases the opening of the base element, and
    a second closure element, which can be fastened to the base element in such a way as to be repeatedly releasable and which, in a container storage mode, secures the first closure element in its closed position and, in a container dispensing mode, is unfastened from the base element and releases the first closure element whereafter the first closure element is operable to bring the first closure element from its closed position into its open position.

2. Closure according to claim 1,
wherein
the first closure element exhibits a first actuation time for moving it from the closed position into the open position and/or vice versa, and the second closure element exhibits a second actuation time for bringing it from its position assigned to the container storage mode into its position assigned to the container dispensing mode, and/or vice versa, provision being made for the first actuation time to be shorter than the second actuation time.

3. Closure according to claim 1,
wherein
the first closure element in the closed position develops a first sealing effect and the second closure element in its position assigned to the container storage mode develops a second sealing effect, provision being made for the second sealing effect to be greater than the first sealing effect.

4. Closure according to claim 2,
wherein
provision is made for the first actuation time to be 1.5 to 10 times shorter than the second actuation time and/or for the second sealing effect to be 1.5 to 1000 times greater than a first sealing effect.

5. Closure according to claim 1,
wherein
a snap connection is provided by means of which the first closure element and the base element can be connected to one another, and/or a screw connection is provided by means of which the second closure element and the base element can be connected to one another.

6. Closure according to claim 1,
wherein
a spout forms the pour opening, and the base element can be fastened to the spout and/or to a retaining ring mounted on the spout.

7. Closure according to claim 1,
wherein
the base element has a fastening section for the purpose of fastening of the first closure element in the closed position.

8. Closure according to claim 7,
wherein
the first closure element has a sealing lip, the sealing lip, in the closed position of the first closure element, bearing against the fastening section in a fluid-tight manner.

9. Closure according to claim 8,
wherein
the fastening section has a sealing groove, and the sealing lip of the first closure element has a sealing bead, the sealing bead, in the closed position of the first closure element, elastically engaging releasably into the sealing groove.

10. Closure according to claim 1,
wherein
the base element has a clamping section which, in the container storage mode, for the purpose of securing the first closure element in its closed position, clamps an annular region of the first closure element between itself and the second closure element in a fluid-tight manner.

11. Closure according to claim 10,
wherein
the clamping section has at least one sealing bead.

12. Closure according to claim 1,
wherein
the base element has a holding section within which the spout a spout of the container can be held for the purpose of fastening the base element on the container, the holding section of the base element having an internal thread for the screwing of the base element onto the container, more particularly onto a retaining ring, and/or having an external thread for the screwing of the second closure element onto the base element.

13. Closure according to claim 12,
wherein
a clamping section follows the holding section at an angle, and/or the fastening section follows the clamping section at an angle for engagement into the spout.

14. Closure according to claim 1,
wherein
the base element has a tray element having at least one hole, preferably having 6 to 12 holes, which is disposed on a container side in relation to the opening of the base element and which bows out away from said opening, the at least one hole allowing the fluid to be supplied to the opening.

15. Closure according to claim 14,
wherein
the tray element is connected in its marginal region to the fastening a fastening section.

16. Closure according to claim 14,
wherein
the base element has an annular section with sealing means, more particularly sealing lamellae, for engagement into the spout in order to seal off a gap between the fastening section and the spout, the annular section being formed with an internal offset with respect to the fastening section, and/or being moulded-on on the tray element.

17. Closure according to claim 12,
wherein
the base element has a collar which follows the holding section and which is provided with at least one retaining cam for engagement into at least one recess of a guarantee band of the second closure element.

18. Closure according to claim 12, wherein
the base element has a collar which follows the holding section and which is provided with at least one latching window for non-releasable engagement with at least one latching hook of the spout, more particularly with a latching hook of the retaining ring mounted on the spout.

19. Closure according to claim 1, wherein
the first closure element is mounted on the base element in such a way that it can be swiveled between its closed position and its open position about a swivel axle.

20. Closure according to claim 19, wherein
the swivel axle is formed on a collar of the base element that follows a holding section, and a lever, more particularly a z-shaped lever connects the swivel axle to the first closure element in an attachment region thereof.

21. Closure according to claim 20, wherein
the base element has a recess in which the lever is disposed retractedly in the closed position of the first closure element.

22. Closure according to claim 20, wherein
the first closure element, more particularly opposite its attachment region on the lever, has an actuating tab for gripping from beneath for single-handed actuation of the first closure element from the closed position into the open position.

23. Closure according to claim 20, wherein
the base element and/or the lever and/or the first closure element are formed as one piece.

24. Closure according to claim 1, wherein
in the storage mode the second closure element is braced with respect to the base element, more particularly by means of a screw connection, the second closure element securing the first closure element by pressing it against the base element in the closed position.

25. Closure according to claim 1, wherein
the second closure element has an annular section, more particularly having an internal thread.

26. Closure according to claim 25, wherein
the second closure element has a guarantee band fastened to the annular section.

27. Packaging form for a fluid, more particularly for an adhesion promoter composition, having a container which has a pour opening, and having a closure according to claim 1, which is mounted in the region of the pour opening for the purpose of closing or opening thereof.

28. Pack consisting of a packaging form according to claim 27 and a fluid, more particularly an adhesion promoter composition.

29. Pack according to claim 28, wherein the adhesion promoter composition comprises at least one adhesion promoter selected from the group consisting of organosilicon compounds, organotitanium compounds, organozirconium compounds, polyisocyanates, isocyanate-containing polymers and mixtures thereof.

30. Pack according to claim 28, wherein the adhesion promoter composition comprises at least one organosilicon compound of the formulae (I) or (II) or (III) or (IV) as adhesion promoter(s)

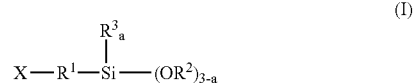

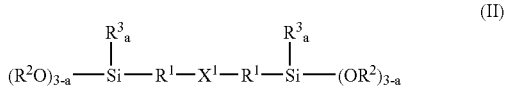

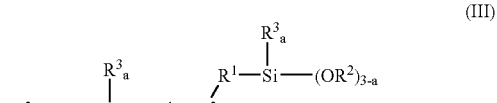

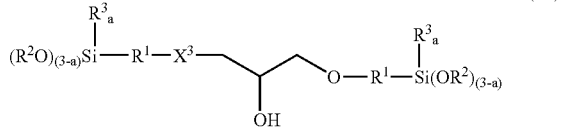

where
$R^1$ is a linear or branched, optionally cyclic, alkylene group having 1 to 20 C atoms, optionally with aromatic fractions, and which optionally has one or more heteroatoms, more particularly nitrogen atoms;
$R^2$ is H or is an alkyl group having 1 to 5 C atoms, more particularly methyl or ethyl, or an acyl group, more particularly acetyl, preferably methyl;
$R^3$ is an alkyl group having 1 to 8 C atoms, more particularly methyl;
X is H, or is a functional group which is selected from the group encompassing oxirane, OH, (meth)acryloyloxy, amine, SH, acylthio and vinyl, preferably amine;
$X^1$ is a functional group which is selected from the group encompassing NH, 5, $S_2$ and $S_4$;
$X^2$ is a functional group which is selected from the group encompassing N and isocyanurate;
$X^3$ is a functional group which is selected consisting of the group S and $NR^5$, where $R^5$ is H, alkyl, cycloalkyl, aryl or the radical of the formula —$Si(R^3)_a(OR^2)_{(3-a)}$;
a is one of the values 0, 1 or 2, preferably 0.

31. Pack according to claim 28, wherein the adhesion promoter composition comprises at least one organosilicon compound and at least one organotitanium compound.

32. Pack according to claim 28, wherein the adhesion promoter composition further comprises a solvent, more particularly having a boiling point of ≦100° C. at 1013 mbar.

* * * * *